United States Patent
Koh et al.

(10) Patent No.: US 9,244,542 B2
(45) Date of Patent: Jan. 26, 2016

(54) STYLUS DEVICE AND A METHOD FOR ASSEMBLING THE STYLUS DEVICE

(71) Applicant: Creative Technology Ltd, Singapore (SG)

(72) Inventors: Zi Kai Koh, Singapore (SG); Wen Hsing Pong, Singapore (SG)

(73) Assignee: Creative Technology Ltd, Singapore (SG)

( * ) Notice: Subject to any disclaimer, the term of this patent is extended or adjusted under 35 U.S.C. 154(b) by 93 days.

(21) Appl. No.: 14/063,507

(22) Filed: Oct. 25, 2013

(65) Prior Publication Data

US 2014/0340370 A1    Nov. 20, 2014

(30) Foreign Application Priority Data

May 16, 2013    (SG) .............................. 201303893-0

(51) Int. Cl.
*G06F 3/0354* (2013.01)
*G06F 3/041* (2006.01)

(52) U.S. Cl.
CPC ............ *G06F 3/03545* (2013.01); *G06F 3/041* (2013.01); *Y10T 29/49826* (2015.01)

(58) Field of Classification Search
CPC ................................................. G06F 3/03545
See application file for complete search history.

(56) References Cited

U.S. PATENT DOCUMENTS

| 2012/0139879 | A1  | 6/2012 | Kim et al. |
| 2012/0146957 | A1* | 6/2012 | Dunagan ....................... 345/179 |
| 2014/0078109 | A1* | 3/2014 | Armstrong-Muntner ..... 345/175 |

FOREIGN PATENT DOCUMENTS

CN    101436107 B    12/2010

* cited by examiner

*Primary Examiner* — Sanjiv D Patel
(74) *Attorney, Agent, or Firm* — Russell Swerdon; Desmund Gean

(57) ABSTRACT

A stylus device for use with a display of a computing device, the stylus device including: a compressible member with a first end of the compressible member being for mounting to a central stem of the stylus device; and a guide structure configured to be mounted to a body of the stylus device, the guide structure having an engaging portion configured to frictionally engage the compressible member as a second end of the compressible member protrudes from the guide structure.

14 Claims, 3 Drawing Sheets

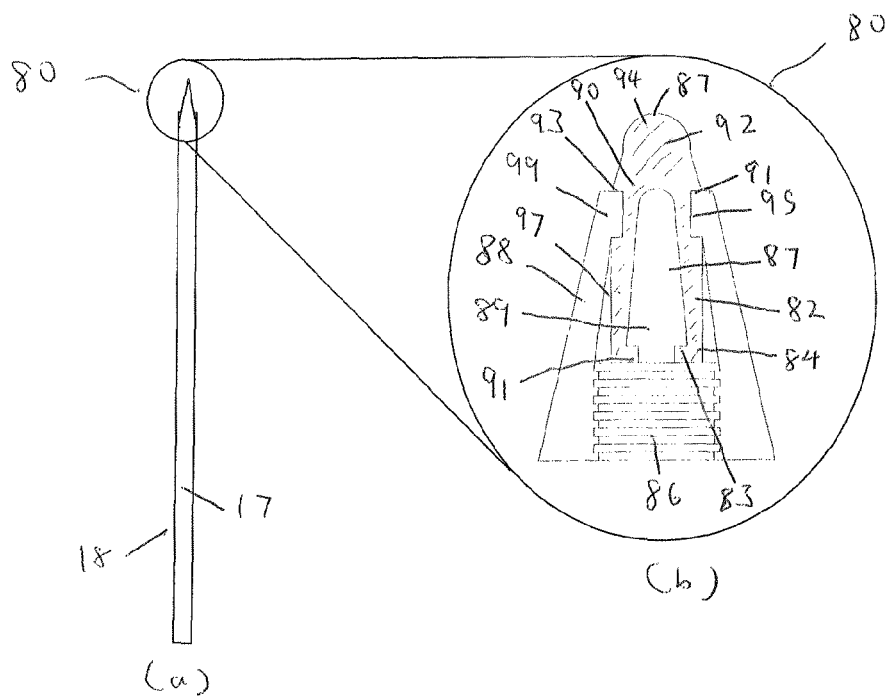
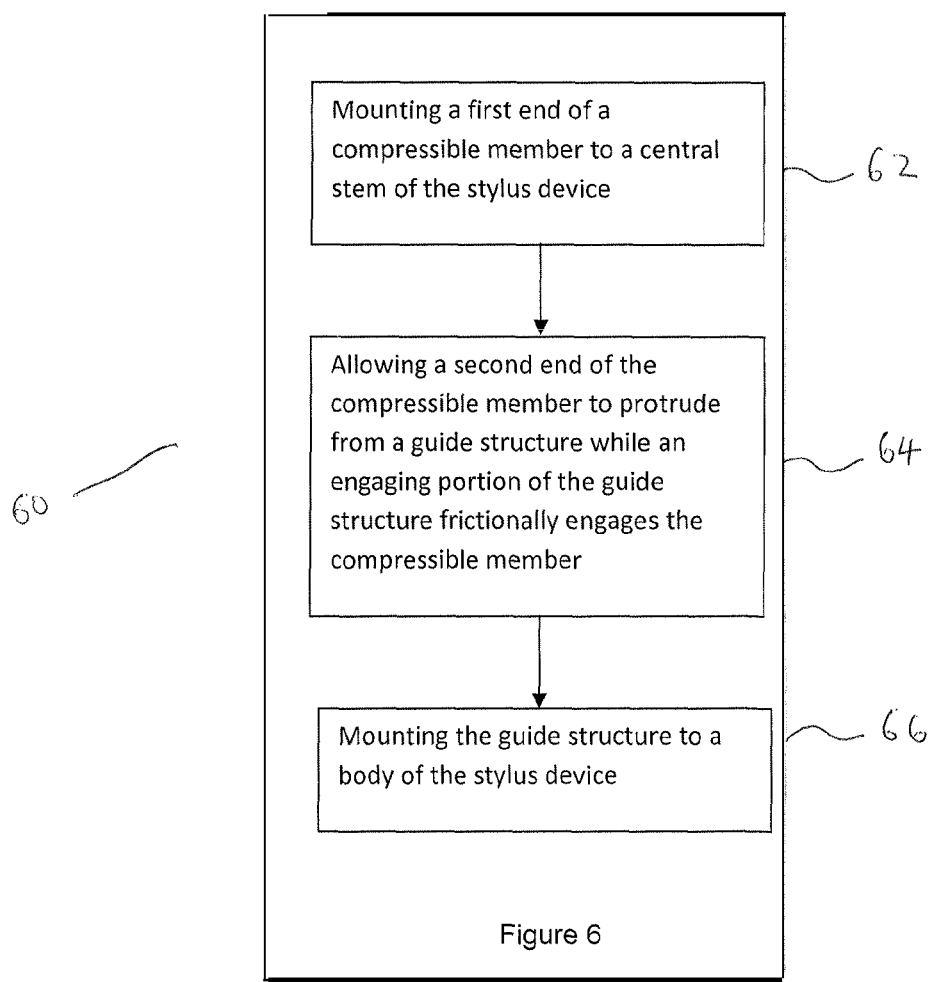
Figure 5
Figure 6

STYLUS DEVICE AND A METHOD FOR ASSEMBLING THE STYLUS DEVICE

FIELD OF INVENTION

The present invention relates to a stylus device.

BACKGROUND

There is an increasing number of computing devices which includes a touch screen display for a user to interface with the computing device. Touch screen displays are commonly found in mobile phones, tablet computers, and notebook computers.

Some users may prefer to use their fingers to make contact with the touch screen displays, but other users dislike the practice as they may have issues relating to, for example, undesirable touch accuracy caused by stubby fingertips, not wanting to leave fingerprints on the touch screen display and so forth. As a result, this has led to the use of stylus devices to enable a user to interface with a touch screen display. Stylus devices with soft tips are commonly used, but a common complaint of stylus devices with soft tips is that such stylus devices may not provide an accurate selection at desired positions on the touch screen display. In addition, the user may also experience physical discomfort when using the soft-tipped stylus devices.

Thus, there are issues pertaining to the use of stylus devices with soft tips.

SUMMARY

There is provided a stylus device for use with a display of a computing device. The stylus device includes a compressible member with a first end of the compressible member being for mounting to a central stem of the stylus device; and a guide structure mounted to a body of the stylus device, the guide member having a an opening defined by a rim, the rim being configured to frictionally engage the compressible member as a second end of the compressible member protrudes from the guide structure.

There is also provided a method to assemble the aforementioned stylus device.

According to a first exemplary aspect, there is provided a stylus device for use with a display of a computing device, the stylus device including: a compressible member with a first end of the compressible member being for mounting to a central stem of the stylus device; and a guide structure configured to be mounted to a body of the stylus device, the guide structure having an engaging portion configured to frictionally engage the compressible member as a second end of the compressible member protrudes from the guide structure.

The central stem may include a threaded portion, the threaded portion being at least partially threaded into an attachment portion of the compressible member.

Alternatively, the central stem may include an elongated protuberance

The compressible member may be of a generally cylindrical shape at a tip of the second end.

The compressible member may be made from a material selected from a group consisting of: rubber, silicon, and foam.

The frictional engagement of the compressible member may ensure rigidity of the compressible member.

The first end of the compressible member may be configured to be in contact with an inner portion of the guide structure, the first end having either a straight or tapered section arranged to engage and match the inner portion of the guide structure.

The second end of the compressible member may be shaped in a form of an enlarged tapered head with a contact edge to rest against a rim of an opening of the guide structure.

The display may be either a capacitive or a resistive touch panel.

The guide structure may be mounted to the body of the stylus device using the central stem.

The second end of the compressible member may protrude from the guide structure by 2 mm.

The guide structure may have an opening defined by a rim, the rim being the engaging portion.

The rim may include a jaw for compressing a side of the compressible member.

The guide structure may have a channel for passage of the second end of the compressible member, the channel being the engaging portion.

The channel may be configured to frictionally engage a wall of the compressible member.

According to a second exemplary aspect, there is provided a method for assembling a stylus device, the stylus device having a compressible member, a central stem and a guide structure having an engaging portion configured to frictionally engage the compressible member, the method including: mounting a first end of the compressible member to the central stem; allowing a second end of the compressible member to protrude through the guide structure while the engaging portion frictionally engages the compressible member; and mounting the guide structure to a body of the stylus device.

The frictional engagement of the compressible member may ensure rigidity of the compressible member.

The guide structure may be configured to anchor the compressible member to the central stem.

DESCRIPTION OF FIGURES

In order that the present invention may be fully understood and readily put into practical effect, there shall now be described by way of non-limitative example only preferred embodiments of the present invention, the description being with reference to the accompanying illustrative figures.

FIG. 5 shows a fifth embodiment of a stylus device, with an enlarged view of head portion.

FIG. 6 shows a process flow for a method of assembly for the stylus device of the present invention.

DESCRIPTION OF PREFERRED EMBODIMENTS

The present invention relates to a stylus device 18 with a replaceable soft tip. It should be appreciated that the stylus device 18 is highly portable and can be held using one hand. The stylus device 18 may be a substantially cylindrical shaped object. The stylus device 18 is typically used when a user is interfacing with a touch screen display of a computing device. The computing device can be, for example, a mobile phone, a tablet computer, a notebook computer and the like.

In addition, the touch screen display is either a capacitive or a resistive touch panel. Even though the stylus device 18 includes a soft tip, a user using the stylus device 18 of the present invention when interfacing with a touch screen display of a computing device would not experience any disruption with regard to natural hand movements and would not experience any physical discomfort. A method for assembling the stylus device is also provided.

Figure 1:
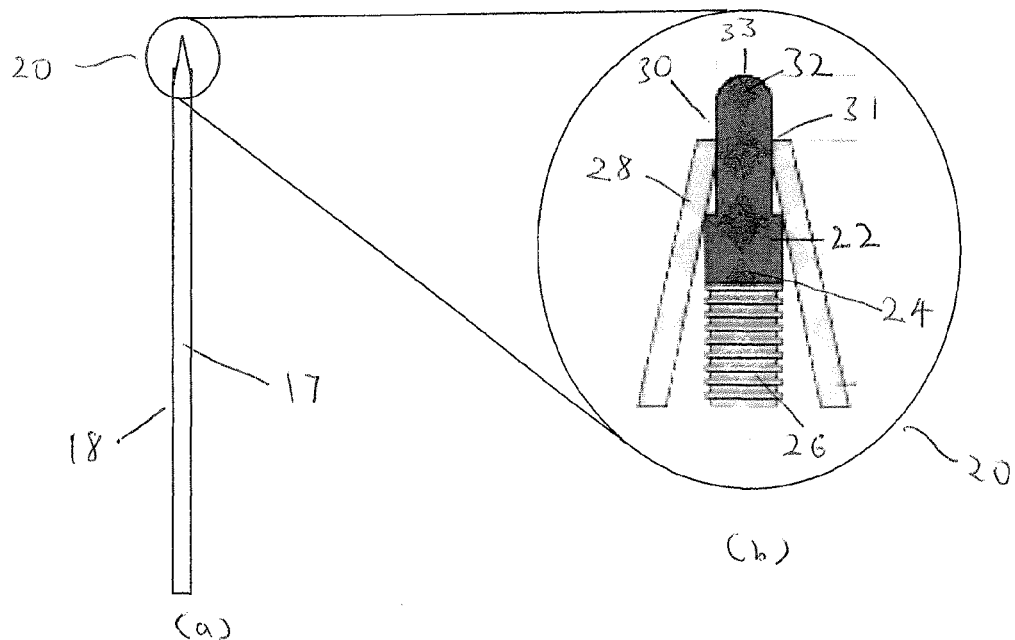
FIG. 1 shows a first embodiment of a stylus device, with an enlarged view of a head portion.

Referring to FIG. 1, there is shown a first embodiment of a stylus device 18. A head portion 20 of the stylus device 18 includes a compressible member 22. FIG. 1(*b*) shows a cross-sectional view of the head portion 20. It should be appreciated that the compressible member 22 can be replaceable. The compressible member 22 is made from a material such as, for example, rubber, silicon, foam and the like.

A first end 24 of the compressible member 22 is configured for mounting to a central stem 26 of the stylus device 18 (not shown in FIG. 1(*a*)). Even though the central stem 26 is shown to be threaded in FIG. 1, it is not mandatory. The threaded central stem 26 can be at least partially threaded into the first end 24 of the compressible member 22. The central stem 26 can be unthreaded, whereby the first end 24 of the compressible member 22 is "worn on" the central stem 26 such that the compressible member 22 is able to be mounted to the central stem 26. Furthermore, it should be appreciated that a substantial portion of the compressible member 22 can be mounted to the central stem 26. FIG. 1 shows nearly one third of the compressible member 22 being mounted to the central stem 26.

The head portion 20 of the stylus device 18 also includes a guide structure 28 mounted to a body 17 of the stylus device 18. The guide structure 28 can be mounted to the body 17 by affixing the guide structure 28 to the threaded central stem 26. The guide structure 28 includes an opening 30. The guide structure 28 is shown to be conical in FIG. 1, but this shape is not mandatory. The opening 30 is configured to allow passage of a second end 32 of the compressible member 22. In the first embodiment, the second end 32 of the compressible member 22 protrudes from the opening 30 by approximately 2 mm. The compressible member 22 can be of a generally cylindrical shape, particularly at a tip 33 of the second end 32. The second end 32 of the compressible member 22 is compressed by a rim 31 defining the opening 30 in order to pass through the opening 30. A portion of the compressible member 22 at the rim 31 of the opening 30 preferably remains under compression (frictional engagement) as the compression enhances rigidity of the compressible member 22. In the first embodiment, the second end 32 of the compressible member 22 has a diameter of approximately 2 to 4 mm. Thus, even though the stylus device 18 has a soft tip (the compressible member 22), the soft tip is sufficiently rigid such that the user using the stylus device 18 of the present invention when interfacing with a touch screen display of a computing device would not experience any disruption with regard to natural hand movements and would not experience any physical discomfort.

It should be appreciated that in the first embodiment of the stylus device 18, the compressible member 22 is sufficiently rigid during use of the stylus device 18.

Figure 2:
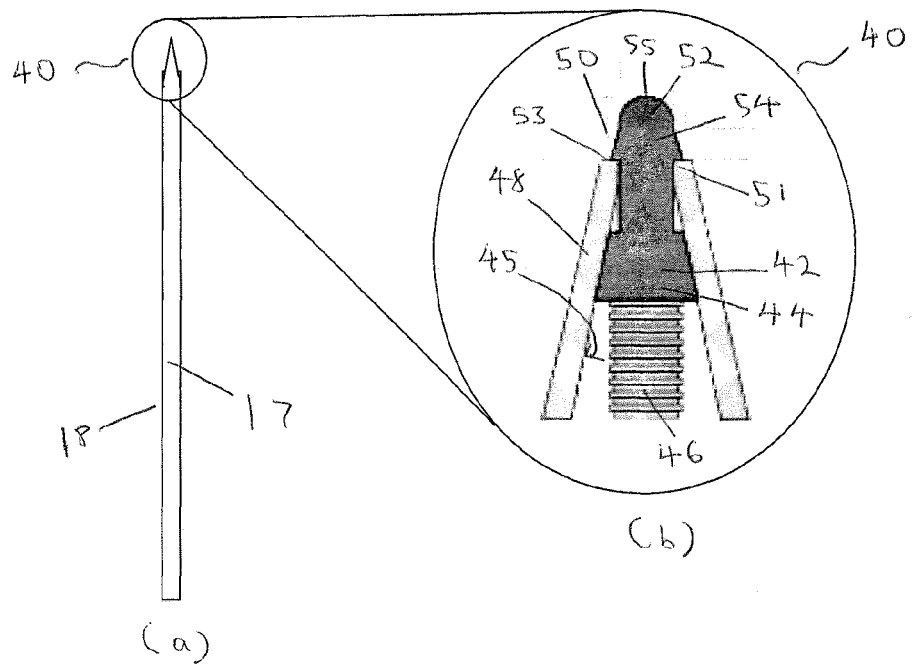
FIG. 2 shows a second embodiment of a stylus device, with an enlarged view of a head portion.

Referring to FIG. 2, there is shown a second embodiment of the stylus device 18. A head portion 40 of the stylus device 18 includes a compressible member 42. FIG. 2(*b*) shows a cross-sectional view of the head portion 40. It should be appreciated that the compressible member 42 can be replaceable. The compressible member 42 is made from a material such as, for example, rubber, silicon, foam and the like.

A first end 44 of the compressible member 42 is configured for mounting to a central stem 46 of the stylus device 18 (not shown in FIG. 2(*a*)). Even though the central stem 46 is shown to be threaded in FIG. 2, it is not mandatory. The threaded central stem 46 can be at least partially threaded into the first end 44 of the compressible member 42. The central stem 46 can be unthreaded, whereby the first end 44 of the compressible member 42 is "worn on" the central stem 46 such that the compressible member 42 is able to be mounted to the central stem 46. Furthermore, it should be appreciated that a substantial portion of the compressible member 42 can be mounted to the central stem 46. FIG. 2 shows that the first end 44 of the compressible member 42 is enlarged. Furthermore, FIG. 2 shows nearly one third of the compressible member 42 being mounted to the central stem 46.

The head portion 40 of the stylus device 18 also includes a guide structure 48 mounted to a body 17 of the stylus device 18. The guide structure 48 can be mounted to the body 17 by affixing the guide structure 48 to the threaded central stem 46. The guide structure 48 includes an opening 50. The guide structure 48 is shown to be conical in FIG. 2, but this shape is not mandatory. The opening 50 is configured to allow passage of a second end 52 of the compressible member 42. The compressible member 42 can be of a generally cylindrical shape, particularly at a tip 55 of the second end 52. Referring to FIG. 2, it should be appreciated that the enlarged first end 44 of the compressible member 42 is in contact with an inner portion 45 of the guide structure 48. The compressible member 42 is anchored to the central stem 46 when the enlarged first end 44 is in contact with the inner portion 45 of the guide structure 48. It should be appreciated that when the guide structure 48 is removed, the enlarged first end 44 need not have a tapered edge and can have a straight edge. Of course, the enlarged first end 44 can have a tapered edge.

In the second embodiment, the second end 52 of the compressible member 42 protrudes from the opening 50 by approximately 2 mm. The second end 52 of the compressible member 42 is compressed by a rim 51 defining the opening 50. A portion of the compressible member 42 at the rim 51 of the opening 50 preferably remains under compression (frictional engagement) as the compression enhances rigidity of the compressible member 42. In the second embodiment, the second end 52 of the compressible member 42 is shaped in a form of an enlarged tapered head 54 having a contact edge 53 to rest against the rim 51 of the opening 50 of the guide structure 48. The enlarged tapered head 54 of the second end 52 prevents the second end 52 from wobbling during use of the stylus device 18. It should be appreciated that the compressible member 42 need not have both the enlarged tapered head 54 and the enlarged first end 44. The compressible member 42 can have either the enlarged tapered head 54 or the enlarged first end 44. Thus, even though the stylus device 18 has a soft tip (the compressible member 42), the soft tip is sufficiently rigid such that the user using the stylus device 18 of the present invention when interfacing with a touch screen display of a computing device would not experience any disruption with regard to natural hand movements and would not experience any physical discomfort.

It should be appreciated that in the second embodiment of the stylus device 18, the compressible member 42 is anchored to the central stem 46, is sufficiently rigid and does not wobble during use of the stylus device 18.

Figure 3:
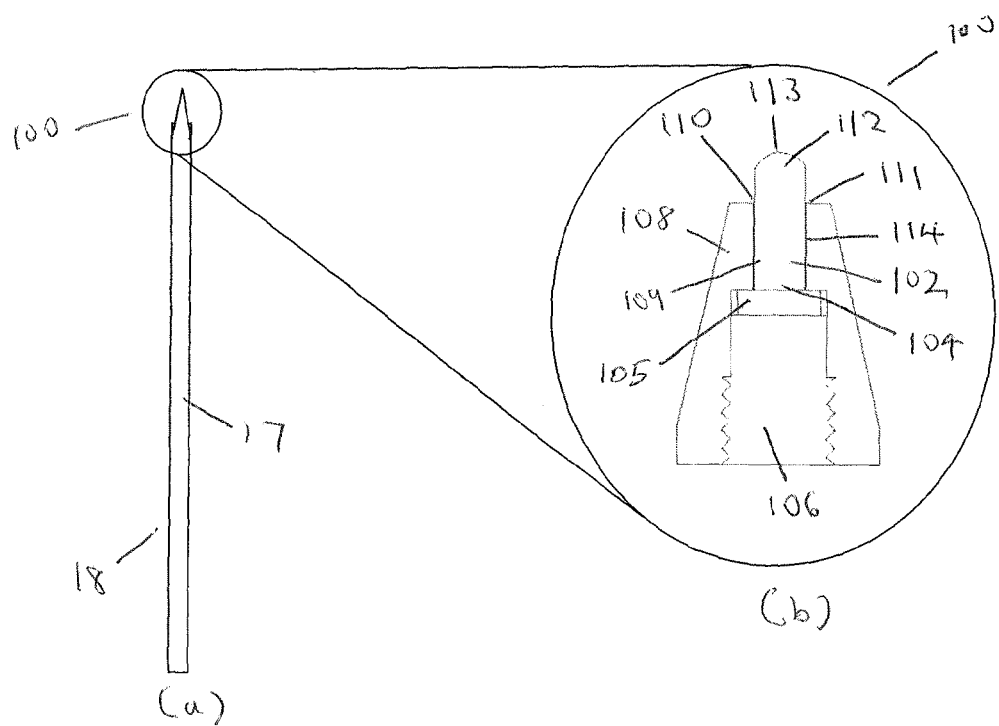
FIG. 3 shows a third embodiment of a stylus device, with an enlarged view of a head portion.

Referring to FIG. 3, there is shown a third embodiment of a stylus device 18. A head portion 100 of the stylus device 18 includes a compressible member 102. FIG. 3(*b*) shows a cross-sectional view of the head portion 100. It should be appreciated that the compressible member 102 can be replaceable. The compressible member 102 is made from a material such as, for example, rubber, silicon, foam and the like.

A first end 104 of the compressible member 102 is configured for placement adjacent to a central stem 106 of the stylus device 18 (not shown in FIG. 3(a)). The first end 104 of the compressible member 102 comprises a flange 105 that is configured to be slightly compressed onto the central stem 106 by a guide structure 108 mounted to a body 17 of the stylus device 18. This compression is necessary to ensure that the compressible member 102 is in constant contact with the central stem 106.

The guide structure 108 can be mounted to the body 17 by affixing the guide structure 108 to the threaded central stem 106. The guide structure 108 includes an opening 110. The guide structure 108 is shown to be conical in FIG. 3, but this shape is not mandatory. The opening 110 is configured to allow passage of a second end 112 of the compressible member 102. In the third embodiment, the second end 112 of the compressible member 102 protrudes from the opening 110 by approximately 2 mm. The compressible member 102 can be of a generally cylindrical shape, particularly at a tip 113 of the second end 112. In the third embodiment, the opening 110 is in a form of a channel 109. A diameter of the channel 109 is such that the channel 109 serves as an engaging portion of the guide structure 108 that is configured to frictionally engage a wall 114 of the compressible member 102. This contact of the channel 109 with the wall 114 of the compressible member 102 minimises wobbling of the compressible member 102 during use of the stylus device 18. In the third embodiment, the second end 112 of the compressible member 102 has a diameter of approximately 2-4 mm. Thus, even though the stylus device 18 has a soft tip (the compressible member 102), the soft tip is sufficiently rigid such that the user using the stylus device 18 of the present invention when interfacing with a touch screen display of a computing device would not experience any disruption with regard to natural hand movements and would not experience any physical discomfort.

It should be appreciated that in the third embodiment of the stylus device 18, the compressible member 102 is sufficiently rigid during use of the stylus device 18.

Figure 4:
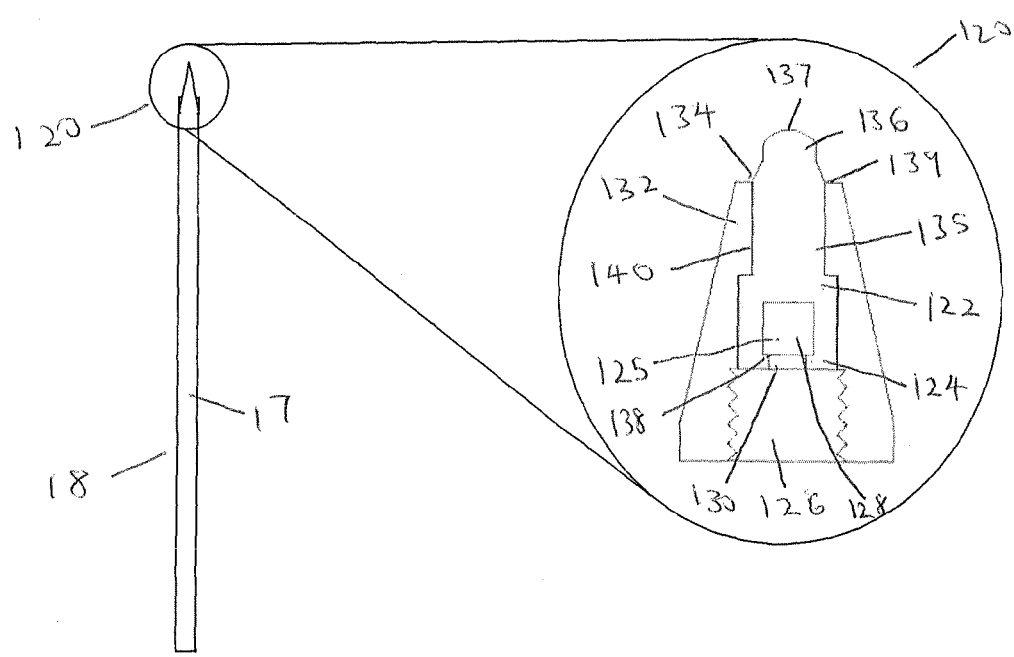
FIG. 4 shows a fourth embodiment of a stylus device, with an enlarged view of a head portion.

Referring to FIG. 4, there is shown a fourth embodiment of the stylus device 18. A head portion 120 of the stylus device 18 includes a compressible member 122. FIG. 4(b) shows a cross-sectional view of the head portion 120. It should be appreciated that the compressible member 122 can be replaceable. The compressible member 122 is made from a material such as, for example, rubber, silicon, foam and the like.

A first end 124 of the compressible member 122 is configured for mounting to a central stem 126 of the stylus device 18 (not shown in FIG. 4(a)). The central stem 126 is shown to include an elongated protuberance 125. The compressible member 122 includes a cavity 128 with an entrance 130 at the first end 124. Passage of the elongated protuberance 125 through the entrance 130 into the cavity 128 enables the compressible member 122 to be mounted to ("worn on") the central stem 126. It should be appreciated that the cavity 128 need not be shaped and sized to fit the elongated protuberance 125. The elongated protuberance 125 aids in anchoring the compressible member 122 and also adds stiffness to the compressible member 122.

The head portion 120 of the stylus device 18 also includes a guide structure 132 mounted to a body 17 of the stylus device 18. The guide structure 132 can be mounted to the body 17 by affixing the guide structure 132 to the central stem 126. The guide structure 132 includes an opening 134. The guide structure 132 is shown to be conical in FIG. 4, but this shape is not mandatory. The opening 134 is configured to allow passage of a second end 136 of the compressible member 122. The compressible member 122 can be of a generally cylindrical shape, particularly at a tip 137 of the second end 136. For instances when the cavity 128 is shaped and sized to fit the elongated protuberance 125, a first end 138 of the elongated protuberance 125 aids in preventing removal of the compressible member 122 when the guide structure 132 is removed from the central stem 126. This makes it easier for the user to replace the compressible member 122 (for example, when the compressible member 122 is worn out) as removal of the compressible member 122 from the central stem 126 is more convenient compared to removal of the compressible member 122 when the compressible member 122 is trapped by the guide structure 132.

In the fourth embodiment, the second end 136 of the compressible member 122 protrudes from the opening 134 by approximately 2 mm. In the fourth embodiment, the opening 134 is in a form of a channel 135. A diameter of the channel 135 such that the channel 135 serves as an engaging portion of the guide structure 132 that is configured to frictionally engage a wall 140 of the compressible member 122. This contact of the channel 135 with the wall 140 of the compressible member 122 minimises wobbling of the compressible member 122 during use of the stylus device 18.

In the fourth embodiment, even though the stylus device 18 has a soft tip (the compressible member 122), the soft tip is sufficiently rigid such that the user using the stylus device 18 of the present invention when interfacing with a touch screen display of a computing device would not experience any disruption with regard to natural hand movements and would not experience any physical discomfort.

It should be appreciated that in the fourth embodiment of the stylus device 18, the compressible member 122 is anchored to the central stem 126, is sufficiently rigid and does not wobble during use of the stylus device 18.

Referring to FIG. 5, there is shown a fifth embodiment of the stylus device 18. A head portion 80 of the stylus device 18 includes a compressible member 82. FIG. 5(b) shows a cross-sectional view of the head portion 80. It should be appreciated that the compressible member 82 can be replaceable. The compressible member 82 is made from a material such as, for example, rubber, silicon, foam and the like.

A first end 84 of the compressible member 82 is configured for mounting to a central stem 86 of the stylus device 18 (not shown in FIG. 5(a)). The central stem 86 is shown to include an elongated protuberance 87. The compressible member 82 includes a cavity 89 with an entrance 91 at the first end 84. Passage of the elongated protuberance 87 through the entrance 91 into the cavity 89 enables the compressible member 82 to be mounted to ("worn on") the central stem 86. It should be appreciated that the cavity 89 need not be shaped and sized to fit the elongated protuberance 87. Furthermore, it should be appreciated that a substantial portion of the compressible member 82 can be mounted to the central stem 86. FIG. 5 shows nearly three quarters of the compressible member 82 being mounted to the central stem 86. The elongated protuberance 87 aids in anchoring the compressible member 82 and also adds stiffness to the compressible member 82.

The head portion 80 of the stylus device 18 also includes a guide structure 88 mounted to a body 17 of the stylus device 18. The guide structure 88 can be mounted to the body 17 by affixing the guide structure 88 to the central stem 86. The central stem 86 is threaded. The guide structure 88 includes an opening 90. The guide structure 88 is shown to be conical in FIG. 5, but this shape is not mandatory. The opening 90 is configured to allow passage of a second end 92 of the compressible member 82. The compressible member 82 can be of a generally cylindrical shape, particularly at a tip 87 of the second end 92. For instances when the cavity 89 is shaped and sized to fit the elongated protuberance 87, a first end 83 of the elongated protuberance 87 aids in preventing removal of the compressible member 82 when the guide structure 88 is removed from the central stem 86. This makes it easier for the user to replace the compressible member 82 (for example, when the compressible member 82 is worn out) as removal of the compressible member 82 from the central stem 86 is more convenient compared to removal of the compressible member 82 when the compressible member 82 is trapped by the guide structure 88.

In the fifth embodiment, the second end 92 of the compressible member 82 protrudes from the opening 90 by approximately 2 mm. The second end 92 of the compressible member 82 is compressed by a rim 91 defining the opening 90 in order to pass through the opening 90. A portion of the compressible member 82 at the rim 91 of the opening 90 remains under compression (frictional engagement) as the compression further enhances rigidity of the compressible member 82. The rim 91 includes a jaw 99 for compressing a side 97 of the compressible member 82. The side 97 of the compressible member 82 may include a groove 95 for locating the jaw 99.

In the fifth embodiment, the second end 92 of the compressible member 82 is shaped in a form of an enlarged tapered head 94 having a contact edge 93 to rest against the rim 91 of the opening 90 of the guide structure 88. The enlarged tapered head 94 of the second end 92 prevents the second end 92 from wobbling during use of the stylus device 18. It should be appreciated that the compressible member 82 need not have both the enlarged tapered head 94 and the cavity 89. The compressible member 82 can have either the enlarged tapered head 94 or the cavity 89, not both. Thus, even though the stylus device 18 has a soft tip (the compressible member 82), the soft tip is sufficiently rigid such that the user using the stylus device 18 of the present invention when interfacing with a touch screen display of a computing device would not experience any disruption with regard to natural hand movements and would not experience any physical discomfort.

It should be appreciated that in the fifth embodiment of the stylus device 18, the compressible member 82 is anchored to the central stem 86, is sufficiently rigid and does not wobble during use of the stylus device 18.

In all the five embodiments of the stylus device 18, the replace-ability of the compressible member 22, 42, 82, 102, 122 with different hardness ratings ensures that usage characteristics of the stylus device 18 can be customizable and adaptable.

Furthermore, the soft tip of the stylus device 18 in all three embodiments provides a usage sensation comparable to that of a fine-tipped writing instrument on the touch screen display of a computing device. In addition, the selection of icons/specific positions on the touch screen display of a computing device is also more precise when the stylus device 18 is used.

In another aspect, there is provided a method 60 for assembling a stylus device 18 as described in the preceding paragraphs. Using the first embodiment of the stylus device 18 as an example, the method 60 includes mounting the first end 24 of the compressible member 22 to the central stem 26 of the stylus device 18 (62); allowing the second end 32 of the compressible member 22 to protrude through the opening 30 of the guide structure 28 while an engaging portion of the guide structure 28 (such as the rim 31 or the channel 109 of the third embodiment) frictionally engages the compressible member 22 (64); and mounting the guide structure 28 to the body 17 of the stylus device 18 (66). The engaging portion of the guide structure 28 that frictionally engages the compressible member 22 is preferably configured to compress a portion of the compressible member 22, correspondingly ensuring rigidity to the compressible member 22. In the instance of the first embodiment of a head portion of the stylus device 18, the method 60 provides a stylus device 18 with a soft tip which is sufficiently rigid during use. Furthermore, using the second embodiment of the stylus device 18 as an example, the guide structure 48 is configured to anchor the compressible member 42 to the central stem 46 and to prevent wobble during use of the stylus device 18.

Thus, the method 60 covers all embodiments of the stylus device 18 and is able to provide a stylus device 18 with a replaceable soft tip which is anchored to the central stem 46, is sufficiently rigid and does not wobble during use.

Whilst there has been described in the foregoing description preferred embodiments of the present invention, it will be understood by those skilled in the technology concerned that many variations or modifications in details of design or construction may be made without departing from the present invention.

The invention claimed is:

1. A stylus device for use with a display of a computing device, the stylus device including:
    a compressible member having a first end and a second end, the first end of the compressible member being for mounting to a central stem of the stylus device and the second end being shaped in the form of an enlarged tapered head having a contact edge; and
    a guide structure configured to be mounted to a body of the stylus device, the guide structure having an opening defined by a rim and an engaging portion configured to frictionally engage the compressible member as the second end of the compressible member protrudes from the opening of the guide structure,
    wherein the contact edge of the enlarged tapered head rests against the rim of the opening such that the enlarged tapered head prevents the second end from wobbling when the stylus device is used.

2. The stylus device of claim 1, wherein the central stem includes a threaded portion, the threaded portion being at least partially threaded into an attachment portion of the compressible member.

3. The stylus device of claim 1, wherein the central stem includes an elongated protuberance.

4. The stylus device of claim 1, wherein the compressible member is of a generally cylindrical shape at a tip of the second end.

5. The stylus device of claim 1, wherein the compressible member is made from a material selected from a group consisting of: rubber, silicon, and foam.

6. The stylus device of claim 1, wherein the frictional engagement of the compressible member ensures rigidity of the compressible member.

7. The stylus device of claim 1, wherein the first end of the compressible member is configured to be in contact with an inner portion of the guide structure, the first end having either a straight or tapered section arranged to engage and match the inner portion of the guide structure.

8. The stylus device of claim 1, wherein the display is either a capacitive or a resistive touch panel.

9. The stylus device of claim 1, wherein the guide structure is mounted to the body of the stylus device using the central stem.

10. The stylus device of claim 1, wherein the second end of the compressible member protrudes from the guide structure by 2 mm.

11. The stylus device of claim 1, wherein the guide structure has an opening defined by a rim, the rim being the engaging portion.

12. The stylus device of claim 11, wherein the rim includes a jaw for compressing a side of the compressible member.

13. The stylus device of claim 1, wherein the guide structure has a channel for passage of the second end of the compressible member, the channel being the engaging portion.

14. The stylus device of claim 13, wherein the channel is configured to frictionally engage a wall of the compressible member.

\* \* \* \* \*